30-32 constant current self-bias of E obtained by bias res. 10 and compensating res. 11.

SEARCHING 69

BEST AVAILABLE COPY

Aug. 4, 1953 H. L. BARNEY 2,647,958

VOLTAGE AND CURRENT BIAS OF TRANSISTORS

Filed Oct. 25, 1949

INVENTOR
H. L. BARNEY
BY Harry C. Hart
ATTORNEY

Patented Aug. 4, 1953 2,647,958

UNITED STATES PATENT OFFICE 2,647,958

VOLTAGE AND CURRENT BIAS OF TRANSISTORS

Harold L. Barney, Madison, N. J., assignor to Bell Telephone Laboratories, Incorporated, New York, N. Y., a corporation of New York Application October 25, 1949, Serial No. 123,507

22 Claims. (Cl. 179—171)

This application is a continuation in part of an earlier application Serial No. 49,951, filed September 18, 1948, and thereafter abandoned.

This invention relates to signal translation by way of circuits including semiconductive elements.

The principal object of the invention is to obtain desired operating conditions of current and of voltage for a semiconductor amplifier in a novel manner. Other objects and features will appear from the description to follow.

Application Serial No. 11,165 of John Bardeen and W. H. Brattain, filed February 26, 1948, and thereafter abandoned, describes and claims an amplifier unit of novel construction, comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the opposite face of the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base, and a load is connected in the collector circuit, it is found that an amplified replica of the source voltage appears across the load impedance. The aforementioned application gives detailed instructions for fabricating the device.

The device may take various forms, all of which have properties which are generally similar, although they differ in important secondary respects. Examples of such other forms are described and claimed in an application of J. N. Shive, Serial No. 44,241, filed August 14, 1948, and an application of W. E. Kock and R. L. Wallace, Jr., Serial No. 45,023, filed August 19, 1948, which issued on July 17, 1951, as Patent No. 2,560,579. The device in all of its forms has received the appellation "Transistor" and will be so designated in the present application. Additional features and aspects of the transistor and its mode of operation are described in United States Patent 2,524,035 which issued October 3, 1950, on an application of John Bardeen and W. H. Brattain Serial No. 33,466, filed June 17, 1948, which is a continuation in part of the earlier application of the same inventors and supersedes it.

The original discovery of the amplifying properties of the transistor was made with the so-called grounded base circuit, with a first potential source connected to apply a negative potential of approximately 40 volts from the base to the collector and a second potential source connected to apply a positive potential of a fraction of a volt from the base to the emitter. An application of H. L. Barney and R. C. Mathes, Serial No. 22,854, filed April 23, 1948, now Patent 2,157,960 issued August 8, 1950, describes and claims certain self-bias circuits by the use of which the second, smaller, bias source may be dispensed with. In principle, the self-bias circuit of the Barney-Mathes patent comprises, in one of its forms, a resistor connected in circuit with the base electrode, its magnitude being so selected that the current flowing through it due to the collector potential bias source is just such as to apply the proper operating bias between the base electrode and the emitter. This resistor is by-passed for signal frequencies by a condenser so that the full signal frequency voltage of the signal source can be applied between the base and emitter of the transistor.

In this form, the self-bias circuit of the aforesaid Barney-Mathes patent is of such a nature that it requires that the direct current which provides the bias flow either through the signal source or through the secondary winding of an input transformer whose primary winding is connected to the signal source. The first alternative is open to the objection that the resulting steady voltage drop through the internal resistance of the signal source may itself be more than enough to provide the required bias; it may indeed provide an excessive bias which then requires some compensation by some means or other. Furthermore the very presence of a steady current flowing through the signal source may be disadvantageous or damaging to the source. The second alternative, namely, the use of an input transformer, is objectionable on the ground that it requires the addition of an apparatus component which is not required for signal transmission, and which therefore should be dispensed with, if possible.

The present invention constitutes an improvement over the self-bias circuits of the aforesaid Barney-Mathes patent in that it provides a simple and convenient self-bias source which gives the required operating voltage bias between the base electrode and the emitter independently of the signal source, and without the use of any input transformer. In its simplest form, a resistor is connected between the input terminals of the transistor amplifier which is of a magnitude substantially greater than is required to provide the necessary voltage bias. This resistor is thus in shunt with the signal source; but, because its resistance is high, it does not seriously load the signal source. At the same time a second resistor is connected in series with an electrode which is common to the input circuit and to the output circuit of the transistor amplifier, namely, the emitter or the base, as the case may be, and the magnitude of this resistor is such that the voltage drop across it due to the current of the collector potential source differs from the magnitude of the voltage drop across the first resistor by the amount of the required voltage bias.

With these connections, one or the other of these two resistors is in series with the emitter, and so tends to control the emitter current; and the greater its magnitude, the more does the emitter current depend on this resistor and the less does it depend on the resistance of the emitter itself, which is generally much smaller. Now it has been found that transistor performance can sometimes be specified with more exactness in terms of emitter current than in terms of emitter-to-base voltage. Consequently, the control of the steady component of the emitter current has merit in itself, quite apart from the voltage drop from the emitter to the base of the transistor due to the flow of this current. Regarded in this light, an important requirement is to provide the steady component of emitter current in a specified amount, regardless of how it is done. The series resistor of large magnitude described above is an approximate solution of this problem purchased at the price of relatively high steady voltages in the input circuit. But a more exact solution is provided by employing a suitable current regulator element, connected in series with the emitter, which acts to stabilize or regulate the emitter current independent of the voltage. There are many elements known to the art which have this property and which are suitable for this use.

In the case of a transistor of N-type germanium which requires a small positive voltage bias on the emitter, the drop across the balancing resistor exceeds the drop across the stabilizing resistor by the amount of the required bias. In the case of a transistor of P-type material, the same is true, though the required polarity of the emitter-to-base bias is opposite to that of N-type transistors.

The invention is applicable to any of the various circuit configurations in which a transistor amplifier may be constructed. In the grounded emitter circuit, the stabilizing element is preferably by-passed for signal frequencies by a condenser, thus avoiding signal frequency feedback, so that the voltage-balancing action takes place for direct current only.

In the grounded base circuit, the balancing element is similarly by-passed for the same reason. However, if such signal frequency feedback is desired, the magnitude of this condenser may be reduced. In an extreme case such as the grounded collector circuit, in which the stabiliizng resistor or other element in the emitter lead is itself the transistor amplifier load, the by-pass condenser is entirely eliminated.

While described principally in connection with amplifier circuits, the invention is equally applicable to modulators, demodulators, detectors, trigger circuits and, generally, to all transistor circuits in which a small operating voltage bias is required between the base electrode and the emitter electrode which is derivable from the current of a collector potential source.

The invention will be fully apprehended from the following detailed description of certain preferred embodiments thereof taken in connection with the appended drawings in which.

Figure 1:
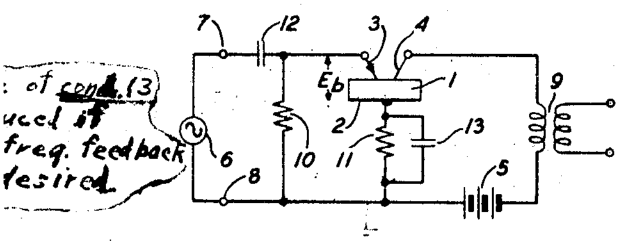
Fig. 1 is a schematic circuit diagram of a transistor amplifier circuit of the grounded base type embodying the invention.

Referring now to the figures, Fig. 1 shows a transistor amplifier comprising a block 1 of N-type germanium provided with a low resistance base electrode 2 which may be a plated metal film on one face of the block 1, an emitter electrode 3 and a collector electrode 4 which may be point contacts spaced a short distance apart on the opposite face. As described in the aforementioned Bardeen-Brattain application, such an arrangement operates as an amplifier when the collector electrode 4 is biased to approximately 40 volts negative by any suitable potential source such as a battery 5 and when the emitter 3 is biased positively with respect to the base electrode by approximately a fraction of a volt. When these conditions are met, a signal voltage derived from any alternating-current signal source 6 such as a microphone, photoelectric cell, the output terminals of a prior stage of a multistage amplifier or the like, may be applied to input terminals 7, 8 and appears between the emitter electrode 3 and the base electrode 2. An amplified replica of the input signal appears across a load in the output circuit of the device, which in this case is connected between the collector electrode 4 and the base electrode 2 and is representatively illustrated by an output transformer 9 whose secondary winding may be connected to a desired load.

The required small positive operating voltage bias for the emitter may be supplied merely by connecting a resistance in series between the base electrode 2 and the emitter 3, and with the source. However, this would require that the steady component of the emitter current flow through the signal source, or that a transformer be interposed. It is desirable, if possible, that the operating bias be entirely independent of the signal source, both for the protection of the source, and to avoid the need of bias readjustment as the source resistance is changed. This is accomplished in accordance with the invention in its simplest form, by connecting the bias resistor in parallel with the source instead of in series. With the resistor so connected, the steady component of the emitter current may be barred from the signal source as by a blocking condenser. To avoid shunting the source for signal frequencies, this emitter bias resistor must be large compared with the source resistance. If a resistor of large magnitude were so connected without compensation, the resulting bias on the electrode would be excessive. Therefore, as a further feature of the present invention, a second resistor 11 is connected between the base electrode 2 and the input terminal 8 which, in the absence of this resistor, would be connected directly to the base 2. The magnitude of this second resistor 11 is such that the voltage drop across it due to the direct current flowing through it under the influence of the collector bias potential source 5 differs from the steady voltage drop across the first resistor 10 by just the amount required to furnish the required base-to-emitter bias. For example, in the case of a typical transistor of N-type germanium which, under best operating conditions draws an emitter current of one milliampere, a base current of two milliamperes and a collector current of three milliamperes and whose emitter resistance lies in the range 500–1000 ohms, the first resistor 10 may be 20,000 ohms, giving a negative voltage drop of 20 volts referred to the positive terminal of the battery 5, and the second resistor 11 may be slightly greater than one half of this or 10,500 ohms, giving a negative voltage drop of 21 volts referred to the same point. The difference $E_b$ of 1 volt appears between the base electrode 2 and the emitter electrode 3 as a positive voltage on the emitter referred to the base, and it is of the proper magnitude and sense to provide the required operating bias.

With this circuit the signal source 6 is relieved of the necessity of carrying the bias-providing current, so that a blocking condenser 12 may be interposed between it and the transistor amplifier. This condenser may be provided as a component element of the amplifier circuit, and serves the double purpose of preventing the flow of direct current from the source to the transistor and consequent possible damage to the latter and also of preventing steady current flow from the collector bias potential source 5 to the signal source 6 and consequent damage to or alternation of the operation of the signal source 6.

The compensating base resistor 11 is preferably by-passed by a condenser 13 whose magnitude is such that its reactance at the lowest signal frequency to be encountered is low compared with the resistance of the compensating resistor. With this arrangement, the signal frequency component of the input signal is effectively applied in full between the base electrode 2 and the emitter 3 and suffers no loss in the compensating resistor 11.

Figure 2:
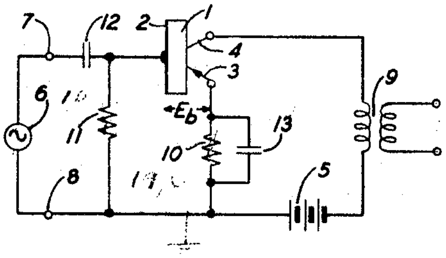
Fig. 2 is a schematic circuit diagram of a transistor amplifier circuit of the grounded emitter type embodying the invention.

The invention is equally applicable to a so-called grounded emitter circuit as shown in Fig. 2. The transistor may be identical with that of Fig. 1 and the associated network and its component elements differ only in that the emitter is now the electrode which is common to the input circuit and to the output circuit. Now, however, the emitter bias resistor 10 is connected from the emitter electrode to the grounded input terminal 8 while the base or compensating resistor 11 is connected between the base 2 and the grounded terminal 8; i. e., it is now the base resistor 11 which is shunted across the signal source. The collector operating potential source 5 and the output load 9 are connected between the collector 4 and the grounded terminal 8. This source 5 causes the flow of current through the emitter resistor 10 to the emitter electrode 3 and through the base resistor 11 to the base electrode 2. In a typical case the emitter current may again be approximately 1 milliampere and the base current approximately 2 milliamperes. In such case, and with a transistor of N-type germanium, requiring an emitter-to-base bias of about 1 volt, the base resistor 11 may have a magnitude of about 10,000 ohms, giving a voltage drop of 20 volts, while the emitter resistor 10 may be about 19,000 ohms across which a drop of 19 volts appears. The difference, $E_b$, appears as a positive bias of 1 volt on the emitter 3 with respect to the base 2. As before, the resistor which is in series with the signal source 6 is by-passed for signal frequencies by a condenser 13; only now this resistor is the emitter resistor 10. As before, the transistor amplifier may be isolated from the source 6 by a condenser 12 which is connected in series with one of the input terminals 7.

Figure 3:
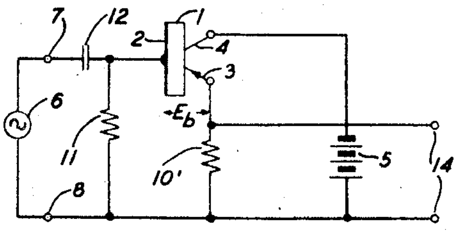
Fig. 3 is a schematic circuit diagram of a transistor amplifier circuit of the grounded collector type embodying the invention.

The invention is also applicable to a transistor circuit connection of the grounded collector type such as that shown in Fig. 3. By analogy with the well-known "cathode follower" circuit of the vacuum tube art, this circuit may appropriately be designated an "emitter-follower" circuit. Here the transistor, the collector bias potential source, the blocking condenser and the base resistor may be the same as in Fig. 2. Taking the same conditions by way of example, the base resistor 11 may have a magnitude of about 10,000 ohms, while the emitter resistor 10 may have a magnitude of about 19,000 ohms. In this circuit configuration, the emitter resistor 10' serves two purposes. First, it provides emitter bias in the manner described above. Second, it serves as an output load, the output terminals being connected across it, namely, between the grounded terminal 8 and the emitter electrode 3. Evidently, in this configuration, the by-pass condenser 13 of Figs. 1 and 2 is preferably omitted.

An important feature of the invention is that the self-bias obtained with the circuits above described is self-compensating, in the sense that a departure of either of the two resistors from its nominal value produces a change in the operating bias which is far smaller in proportion than the resistance change which causes it. Thus, for example, suppose that in Fig. 1 the compensating resistor 11 should be twice its intended value. As a result, the current from the potential source 5 to the base electrode 2 would decrease to a substantial extent so that the voltage drop across this resistor would change by a much smaller factor. Suppose, for example, it were to change by a factor of 10 per cent. Hence, in the example taken above, the voltage on the base electrode 2 would be increased by 10 per cent of 21 volts or by 2.1 volts, to 23.1 volts. This would at first tend to place a bias voltage of 3.1 volts on the emitter 3 instead of the required 1 volt; but such an increase of emitter voltage would immediately result in an increase of emitter current, producing an increased voltage drop across the self-bias resistor 10 and so a reduction in the emitter-to-base voltage, thus automatically correcting for the incorrect value of the compensating resistor 11.

This prediction is fully borne out by the facts. Thus, in the case of an actual test with the circuit of Fig. 1, the magnitude of the emitter resistor 10 was changed all the way from 26,800 ohms to 105,000 ohms, yet the resulting change in the emitter-to-base voltage bias of the transistor was only from 0.6 volt to 0.5 volt.

The actual data recorded in this test are as follows:

| $R_{10}$ (ohms) | $R_{11}$ (ohms) | $V_{10}$ (volts) | $V_{11}$ (volts) | $E_b$ (volts) | $I_e$ (ma.) | $I_c$ (ma.) | $I_b$ (ma.) |
|---|---|---|---|---|---|---|---|
| 26,800 | 10,000 | 16.1 | 16.7 | 0.6 | 0.6 | 2.27 | 1.67 |
| 105,000 | 10,000 | 16.8 | 17.3 | 0.5 | 0.16 | 1.89 | 1.73 |

where:

$R_{10}$ and $R_{11}$ are the resistance values, in ohms, of the emitter resistor and of the base resistor, $V_{10}$ and $V_{11}$ are the voltage drops, in volts, across them, $E_b$ is the emitter-to-base voltage, $I_e$, $I_c$, and $I_b$ are the emitter current, the collector current, and the base current, respectively.

This compensating, or voltage-self-adjusting feature holds equally well with the circuits of Figs. 2 and 3.

As pointed out above, the input resistance of a typical transistor, namely the resistance between the emitter terminal and the base terminal, is in the range 500 to 1000 ohms. Values in actual cases are randomly distributed within this range, rarely lying outside of it.

Now in Fig. 1, the magnitude of the external resistor which is connected in series with the emitter is 20,000 ohms, while in Figs. 2 and 3, it is 19,000 ohms. Either of these resistance values is many times as large as the input or base-to-emitter resistance of the transistor. Consequently, with the circuit arrangement of these figures, a departure of the transistor's input resistance from its normal value affects the magnitude of the emitter current only to a small extent. To the contrary, the magnitude of the emitter current is substantially determined by the voltage of the potential source 5 and the magnitudes of the resistors 10 and 11.

Thus, the circuits of Figs. 1, 2, and 3 may be regarded as furnishing to the emitter an operating or "bias" current whose magnitude is largely independent of the emitter resistance itself, and which is, therefore, approximately constant despite the substitution of one transistor for another even though such substitution may involve a change in the value of the emitter resistance of several hundred ohms. This approximately constant emitter bias current is obtained by virtue of the large emitter resistor through which the current is driven by a suitably large voltage.

Specifically, in the foregoing numerical example, in which a transistor having an emitter resistance of 1000 ohms was employed, a change in the magnitude of the resistance in series with the emitter electrode through a range of 78,200 ohms resulted in a reduction in the emitter current from 0.6 milliampere to 0.16 milliampere.

By way of contrast, the operation of a transistor biased by a low-resistance, low-potential source such as a separate battery may be considered. If the battery were assumed to have a potential of 0.6 volt and to be connected in series with the winding of an input transformer having negligible resistance, the emitter current, limited by the emitter resistance of 1000 ohms, would be 0.6 milliampere.

If, however, the resistance of the emitter contact were to be increased, or an external resistance were to be added in series with the emitter, the magnitude of the added resistance could be nowhere near as great as the increase of 78,200 ohms in the above case, before the emitter current would be reduced to 0.16 milliampere. In fact, the increased resistance in the emitter circuit would have to be considerably less than 3500 ohms if the emitter current were not to be reduced below 0.16 milliampere. This comparison exemplifies the stabilizing effect of the present invention on the emitter current, as well as on the emitter-to-base bias potential, when compared to the conventional bias arrangement with a separate, low impedance bias battery for the emitter.

Figure 4:
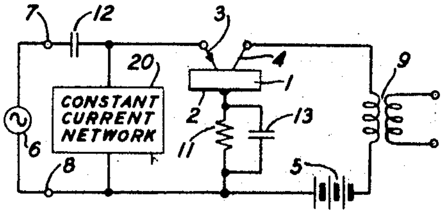
Figs. 4, 5 and 6 are schematic circuit diagrams of transistor amplifier circuits which are alternatives of Figs. 1, 2, and 3, respectively.

In accordance with another phase of the invention, still greater constancy of the emitter bias current may be secured by the use of a current regulating or current stabilizing device in place of the emitter resistor. Fig. 4, which is otherwise the same as Fig. 1, shows a circuit in which the resistor 10 of Fig. 1 is replaced by such a device 20, of which the so-called "ballast tube," the pentode, and the series-connected cathode follower tube circuit are only three of a number of examples.

Such a device is characterized by a substantially infinite alternating-current impedance, and, at the same time, a direct-current resistance which is by no means large. Its infinite alternating-current impedance acts to hold the emitter bias current constant, while the magnitude of this emitter current may be adjusted to a desired value for transistor purposes by appropriate selection or adjustment of the stabilizer 20.

Figure 5:
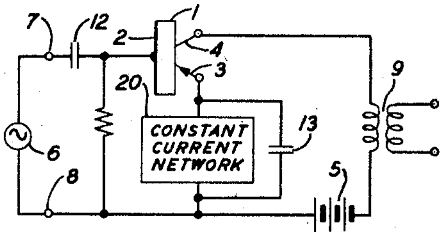
Figure 6:
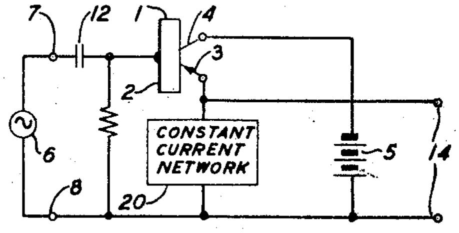

Figs. 5 and 6 show the inclusion of a current stabilizing device 20 in place of the emitter resistor in the circuits of Figs. 2 and 3, where it operates, as described above, to hold the emitter current constant. In Fig. 5 which, like Fig. 2 is of the grounded emitter configuration, it is by-passed at signal frequencies by a condenser 13. In Fig. 6 which, like Fig. 3, is of the grounded collector configuration, such by-passing is not resorted to, but the constant current network 20 supports the output signal voltage of the network, as well as serving to stabilize the emitter current.

Figure 7:
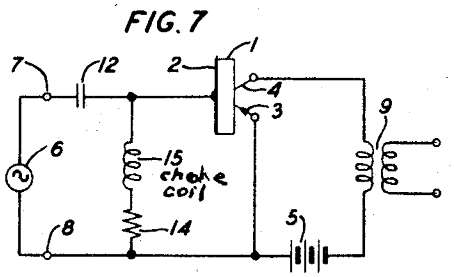
Fig. 7 is a schematic circuit diagram of another alternative to Fig. 2.

At the sacrifice of the self-compensation feature and of the constant emitter current feature of the foregoing embodiments of the invention, the emitter-to-base bias may be made independent of the source resistance and the emitter bias current segregated from the source by means of another circuit arrangement as shown for the case of the grounded emitter network in Fig. 7. Here the transistor with its electrodes, the potential source 5, the signal source 6, the blocking condenser 12 and the load 9 may be as shown in Fig. 2. But in place of the nearly balanced resistors 10 and 11, a series combination of a small resistor 14 and a choke coil 15 is connected across the input to the transistor, namely between the base 2 and the emitter 3. The resistor 14 has a magnitude such that, when the base current flows through it, the resulting voltage drop across it is equal to the required base-to-emitter bias. Thus a resistance of 500 ohms gives a bias of 1 volt with a current of 2 milliamperes. Addition of the choke coil 13 in series, its impedance being high at all frequencies of interest, prevents this comparatively low resistance from placing a load on the source, while the blocking condenser 12 prevents the steady emitter current from flowing through the source 6.

The invention, while described in connection with an amplifier comprising a single transistor stage, is equally applicable to multistage amplifiers in which the stages are the same or different in configuration. Furthermore, it applies to devices intended principally for functions other than straightforward amplification, namely, to modulators, demodulators, trigger circuits, switching devices, and generally to transistor circuits of all types in which a base-to-emitter bias is derivable by way of a combination of resistors from a collector bias potential source.

Subject matter related to the foregoing is disclosed and claimed in an application of C. O. Mallinckrodt, Serial No. 96,577, filed June 1, 1949.

What is claimed is:

1. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting two of said electrodes, an output circuit interconnecting the third electrode with one of said first two named electrodes, said one electrode thus being common to the input and output circuits, a potential source in said output circuit for applying operating potential to said collector electrode, a first resistance element interconnecting said input terminals, and a second resistance element connected in series with said common electrode, the magnitudes of the resistances of said elements being proportioned to produce a steady potential drop across the first element due to current of the source and a steady potential drop across the second element due to current of the source which differs from said first-named potential drop by the amount of a desired base-to-emitter operating bias.

2. In the combination defined in the foregoing claim, a by-pass condenser connected in shunt with the second resistance element.

3. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting said base electrode with said emitter electrode, an output circuit interconnecting said collector electrode with one of said first two named electrodes, said one electrode thus being common to the input and output circuits, a potential source in said output circuit for applying operating potential to said collector electrode, a first resistance element interconnecting said input terminals, and a second resistance element connected in series with said common electrode, the magnitudes of the resistances of said elements being proportioned to produce a steady potential drop across the first element due to current of the source and a steady potential drop across the second element due to current of the source which differs from said first-named potential drop by the amount of a desired base-to-emitter operating bias.

4. In combination defined by the preceding claim, a by-pass condenser connected in shunt with the second resistance element.

5. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting said base electrode with said emitter electrode, an output circuit interconnecting said collector electrode with said base electrode, said base electrode thus being common to the input and output circuits, a potential source in said output circuit for applying operating potential to said collector electrode, a first resistor connected in said input circuit, and a second resistor connected in series with said base electrode, the magnitudes of said resistors being proportioned to produce a steady potential drop across the first resistor due to current of the source and a steady potential drop across the second resistor due to current of the source which differs from said first-named potential drop by the amount of a desired base-to-emitter operating bias.

6. In the combination defined in the foregoing claim, a by-pass condenser connected in shunt with the second resistor.

7. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting said base electrode with said emitter electrode, an output circuit interconnecting said collector electrode with said emitter electrode, said emitter electrode thus being common to the input and output circuits, a potential source in said output circuit for applying operating potential to said collector electrode, a first resistor connected in said input circuit, and a second resistor connected in series with said emitter electrode, the magnitudes of said resistor being proportioned to produce a steady potential drop across the first resistor due to current of the source and a steady potential drop across the second resistor due to current of the source which differs from said first-named potential drop by the amount of a desired base-to-emitter operating bias.

8. In combination defined in the foregoing claim, a by-pass condenser connected in shunt with the second resistor.

9. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting said base electrode with said collector electrode, an output circuit interconnecting said collector electrode with said emitter electrode, said collector electrode thus being common to the input and output circuits, a potential source for applying operating potential to said collector electrode, a self-bias resistor connected in said input circuit, and a load resistor connected in series with said emitter electrode, the magnitudes of said resistors being proportioned to produce a steady potential drop across the self-bias resistor due to current of the source and a steady potential drop across the load resistor due to current of the source which differs from said first-named potential drop by the amount of a desired base-to-emitter operating bias.

10. In combination with a source of alternating current signals having in series therewith a condenser for preventing the flow of steady current to said source, a signal translation network for the signal of said source which includes, as its active element, a transistor comprising a semiconductor body, a base electrode, an emitter electrode and a collector electrode cooperatively associated therewith, an input circuit interconnecting two of said electrodes, an output circuit interconnecting the third electrode with one of said first two named electrodes, said one electrode thus being common to the input and output circuits, a potential source in said output circuit for applying operating potential to said collector electrode, a first resistor connected in series in said input circuit, and a second resistor connected in series with said common electrode, the magnitudes of said resistors being proportioned to produce a potential drop across the first resistor due to current of the source and a potential drop across the second resistor due to current of the source which differs from said first-named potential drop by the amount of a desired base-to-emitter operating bias, input terminals connected to the ends of said first resistor, and a blocking condenser connected in series with at least one of said input terminals.

11. In the combination defined in the foregoing claim, a by-pass condenser connected in shunt with the second resistor.

12. In combination with a source of alternating current signals having in series therewith a condenser for preventing the flow of steady current to said source, a signal translation network for the signal of said source which includes, as its active element, a transistor comprising a semiconductive body, a base electrode, an emitter electrode and a collector electrode cooperatively associated therewith, two resistance elements connected in series between said base electrode and said emitter electrode, input terminals connected in shunt with one of said resistance elements, output terminals one of which is connected to the common point of said two resistance elements, and a potential source connected to apply operating potential to said collector electrode, the magnitudes of the resistances of said elements being proportioned to produce a steady potential drop across one of said elements due to current of the source and a steady potential drop across the other element due to current of said source which differs from said first-named potential drop by the amount of a desired base-to-emitter operating bias.

13. In the combination defined in the preceding claim, a by-pass condenser connected in shunt with that one of said resistance elements which is not in shunt with said input terminals.

14. In combination with a source of alternating current signals having in series therewith a condenser for preventing the flow of steady current to said source, a signal translating network for the signal of said source which includes, as its active element, a transistor comprising a semiconductive body, a base electrode, an emitter electrode and a collector electrode cooperatively associated therewith, a potential source connected in series with said collector electrode, and a resistance element whose magnitude is large compared with the input resistance of the transistor connected in series with the emitter electrode and with said potential source, the magnitude of the resistance of said element being proportioned to cause a steady emitter current of a desired magnitude to flow in response to the electromotive force of said potential source.

15. In combination with a source of alternating current signals having in series therewith a condenser for preventing the flow of steady current to said source, a signal translating network for the signal of said source which includes, as its active element, a transistor comprising a semiconductive body, a base electrode, an emitter electrode and a collector electrode cooperatively associated therewith, a potential source connected in series with said collector electrode, a first resistance element whose magnitude is large compared with the input resistance of the transistor connected in series with the emitter electrode and with said source, a second resistance element whose magnitude is large compared with the input resistance of the transistor connected in series with the base electrode and with said source the magnitudes of the resistances of said elements being proportioned to cause steady currents of preassigned magnitudes to flow, in response to the electromotive force of said potential source, to the emitter electrode and to the base electrode, respectively.

16. In combination with a source of alternating current signals having in series therewith a condenser for preventing the flow of steady current to said source, a signal translating network for the signal of said source which includes, as its active element, a transistor comprising a semiconductive body, a base electrode, an emitter electrode and a collector electrode cooperatively associated therewith, an input circuit interconnecting two of said electrodes, an output circuit interconnecting the third electrode with one of said first two named electrodes, said one electrode thus being common to the input and output circuits, a potential source in said output circuit for applying operating potential to said collector electrode, a first resistance element whose magnitude is large compared with the input resistance of the transistor connected in series with the emitter electrode, and a second resistance element whose magnitude is large compared with the base resistance of the transistor connected in series with the base electrode, the magnitudes of the resistances of said elements being proportioned to cause steady currents of preassigned magnitudes to flow, in response to the electromotive force of said potential source, to the emitter electrode and to the base electrode, respectively.

17. Signal translating apparatus which comprises a transistor having an emitter electrode, a collector electrode and a base electrode, a source of electric energy, connections for applying the potential of said source as an operating voltage bias to the collector, means for deriving a substantially constant current from said source, and means for supplying said substantially constant current to the emitter electrode.

18. Signal translating apparatus which comprises a transistor having an emitter electrode, a collector electrode and a base electrode, a potential source, a first path extending from one terminal of the source to the collector electrode, a second path extending from the other terminal of the source to the base electrode, and a third path extending from said other source terminal to the emitter electrode, said third path including a current stabilizing element.

19. Apparatus as defined in claim 18 wherein said current stabilizing element is a non-linear constant current network.

20. Apparatus as defined in claim 18 wherein said current stabilizing element is a resistor of resistance which is large compared with the emitter resistance.

21. Signal translating apparatus which comprises a transistor having an emitter electrode, a collector electrode and a base electrode, a source of electric energy, connections for applying the potential of said source as an operating bias between the emitter and the collector, a choke coil and a resistor connected in series between the base electrode and the emitter, the magnitude of said resistor being such that the steady voltage drop across it due to flow of base current through it furnishes a desired emitter-to-base bias, an input circuit connected between the emitter and the base, and a load connected in series with the collector.

22. In a signal translating circuit which comprises a transistor having a semiconductive body, an emitter electrode, a base electrode and a collector electrode engaging said body and an external network including a point of fixed potential interconnecting said electrodes, means for supplying a substantially constant emitter bias current to said emitter electrode which comprises an external resistor whose magnitude is many times greater than the internal emitter resistance of said transistor connected in series between said emitter electrode and said fixed potential point, means including a potential source for driving current through said resistor and said emitter electrode, whereby a steady potential drop of substantial magnitude exists across said resistor between said emitter electrode and said fixed potential point, and means connecting said base electrode to said fixed potential point for establishing on said base electrode a potential which differs from the emitter electrode potential by a small amount which is less than said potential drop.

HAROLD L. BARNEY.

References Cited in the file of this patent

UNITED STATES PATENTS

| Number | Name | Date |
|---|---|---|
| 2,020,297 | Buckley et al. | Nov. 12, 1935 |
| 2,369,138 | Cook | Feb. 13, 1945 |
| 2,476,323 | Rack | July 19, 1949 |
| 2,517,960 | Barney et al. | Aug. 8, 1950 |
| 2,524,034 | Brattain et al. | Oct. 3, 1950 |
| 2,554,469 | Minzner | May 22, 1951 |